US008615103B2

(12) United States Patent　　(10) Patent No.: US 8,615,103 B2
Xu　　(45) Date of Patent: Dec. 24, 2013

(54) METHOD AND SYSTEM FOR EMBEDDING AND EXTRACTING IMAGE DIGITAL WATERMARK

(75) Inventor: Hujun Xu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 133 days.

(21) Appl. No.: 13/258,003

(22) PCT Filed: Jun. 21, 2010

(86) PCT No.: PCT/CN2010/074143
§ 371 (c)(1),
(2), (4) Date: Dec. 5, 2011

(87) PCT Pub. No.: WO2011/026365
PCT Pub. Date: Mar. 10, 2011

(65) Prior Publication Data
US 2012/0163652 A1　　Jun. 28, 2012

(30) Foreign Application Priority Data

Sep. 3, 2009　(CN) .......................... 2009 1 0171289

(51) Int. Cl.
*G06K 9/00*　　(2006.01)
(52) U.S. Cl.
USPC .......................................... 382/100; 382/248
(58) Field of Classification Search
None
See application file for complete search history.

(56) References Cited

U.S. PATENT DOCUMENTS

| 6,226,387 | B1 | 5/2001 | Tewfik et al. | |
|---|---|---|---|---|
| 6,556,689 | B1 * | 4/2003 | Xia et al. | 382/100 |
| 6,975,733 | B1 * | 12/2005 | Choi et al. | 381/100 |
| 2003/0095682 | A1 * | 5/2003 | Joo et al. | 382/100 |
| 2006/0293881 | A1 * | 12/2006 | Hou | 704/203 |

FOREIGN PATENT DOCUMENTS

| CN | 1658223 | A | 8/2005 |
|---|---|---|---|
| CN | 101042769 | A | 9/2007 |
| CN | 101699508 | A | 4/2010 |
| JP | 2004-221925 | A | 8/2004 |
| WO | 0217214 | A2 | 2/2002 |

OTHER PUBLICATIONS

Ali Al-Haj, "Combined DWT-DCT Digital Image Watermarking", 2007, Journal of Computer Science 3(9): pp. 740-746.*

(Continued)

*Primary Examiner* — Bhavesh Mehta
*Assistant Examiner* — Siamak Harandi
(74) *Attorney, Agent, or Firm* — Ling Wu; Stephen Yang; Ling and Yang Intellectual Property (57) ABSTRACT

The present invention provides a method and a system for embedding and extracting an image digital watermark. The method includes: performing a DWT on an original carrier digital image to obtain two intermediate frequency coefficient matrixes; firstly performing a DCT on one of the two intermediate frequency coefficient matrixes, then performing the DWT, and then selecting an obtained low frequency coefficient matrix as a first low frequency coefficient matrix; performing the DWT on another intermediate frequency coefficient matrix, and then selecting an obtained low frequency coefficient matrix as a second low frequency coefficient matrix; and adjusting magnitude of a first frequency coefficient and a second frequency coefficient according to watermark values to be embedded at said embedment locations to make a magnitude relationship between two adjusted low frequency coefficients comply with a corresponding relationship between a preset embedded value and a magnitude relationship between the two low frequency coefficients.

10 Claims, 4 Drawing Sheets

(56) References Cited

OTHER PUBLICATIONS

International Search Report for PCT/CN2010/074143 dated Sep. 2, 2010.

In-Kwon Yeo, Hyoung Joong Kim: Generalized patchwork algorithm for image watermarking; Multimedia Systems 9: 261-265 (2003); Digital Object Identifier (DOI) 10.1007/s00530-003-0097-0.

* cited by examiner

METHOD AND SYSTEM FOR EMBEDDING AND EXTRACTING IMAGE DIGITAL WATERMARK

TECHNICAL FIELD

The present invention relates to the field of computer information security and copyright protection, and more especially, to a method and system for embedding and extracting image digital watermark.

BACKGROUND OF THE RELATED ART

Digital watermark technique refers to use the signal processing technique to embed a hidden mark in digital multimedia data, and this kind of marks is usually invisible and only can be extracted through a dedicated detector or reader. The information embedded in the digital media can be called as the digital watermark only if the information embedded in the digital media has following two basic properties to be able to called digital watermark:
  (a) invisibility: embedding the digital watermark in digital media will not degrade the quality evidently, and it is unnoticeable;
  (b) robustness: robustness means the digital watermark can still maintain the integrity or can be accurately identified after experiencing a variety of unintentional or intentional signal processing. Possible signal processing comprises channel noise, filtering, digital/analog conversion, analog/digital conversion, re-sampling, shearing, displacement, scale changing, and lossy compression coding and so on.

In current various techniques for embedding and extracting the watermark, the transform domain watermark becomes a more important watermark technique due to the advantage that it can embed a large amount of data without reducing the invisibility of the watermark. Such technique is generally based on the common image transforms and based on partial or full transforms, and these transforms include the Discrete Cosine Transform (DCT), Discrete Wavelet transform (DWT), Discrete Fourier Transform (DFT), Singular Value Decomposition (SVD), and Discrete Hadamard Transform (DHT) and so on, wherein the DCT based on the block is one of the most commonly used transform, and the still image compression standard JPEG also based on the block DCT.

One of the earliest digital watermark techniques based on the block DCT is that a key randomly selects a plurality of blocks in an image, and a triple is slightly changed in the intermediate frequency coefficients of the frequency domain coefficients to hide binary sequence information. Selecting to code the intermediate frequency component is because the high frequency coding is easily damaged by a variety of signal processing methods, and the low frequency coding changes are easily noticeable since human vision is very sensitive to low frequency components. The digital watermark technique is robust to the lossy compression and the low pass filtering.

Another DCT digital watermark technique is first dividing the image into 8×8 non-overlapped blocks, obtaining frequency blocks composed by DCT coefficients after dividing into blocks of DCT, then randomly selecting a plurality of frequency blocks, and embedding the watermark signal into a plurality of DCT coefficients selected under the control of the key. The method slightly changes the selected DCT coefficients to meets the specific relationship so as to represent information of one bit. When extracting the watermark information, the same DCT coefficients are selected and the bit information is extracted according to the relationship between the coefficients.

Besides the abovementioned representative transform domain methods, there are further a plurality of digital watermark techniques based on the transform domain, a considerable portion of these techniques are the improvement and development of the abovementioned methods, wherein a representative method is the one proposed by I. Podichuk and Zeng Wen-jun. The method is based on the DCT or wavelet transform of still images and studies where the digital watermark returned by the vision model module should be loaded and the affordable Just Noticeable Difference (JND) value (the intensity upper limit of loading the watermark) at each place, and this watermark method is adaptive.

To date, most digital watermarks based on the transform domain are private watermarks, in which the original digital media is needed so that the digital watermarks can be detected, and the private watermarks can only be used as copyright protection, which largely limits the application range of digital watermark techniques. Besides, the existing digital watermark techniques only use a single transform to embed the watermarks, which makes the anti-attack ability of the watermarks greatly reduced.

SUMMARY OF THE INVENTION

The technical problem to be solved in the present invention is to provide a method and a system for embedding and extracting an image digital watermark, which are used for the copyright protection of digital images and also for hiding the data which requires hiding, and thus the method and system can be widely used in the fields of copyright protection and information secrecy.

In order to solve the above technical problem, the present invention provides a method for embedding an image digital watermark, and the method comprises:
  performing a DWT on an original carrier digital image to obtain two intermediate frequency coefficient matrixes;
  firstly performing a DCT on one of the two intermediate frequency coefficient matrixes, then performing the DWT, and then selecting an obtained low frequency coefficient matrix as a first low frequency coefficient matrix;
  performing the DWT on another intermediate frequency coefficient matrix, and then selecting an obtained low frequency coefficient matrix as a second low frequency coefficient matrix; and
  adjusting magnitude of a first frequency coefficient and a second frequency coefficient at various same embedment locations in the first low frequency coefficient matrix and the second low frequency coefficient matrix according to watermark values to be embedded at said embedment locations to make a magnitude relationship between two adjusted low frequency coefficients comply with a corresponding relationship between a preset embedded value and a magnitude relationship between the two low frequency coefficients.

The above method for embedding the image digital watermark can further have following characteristics:
  after performing the DWT on the original carrier digital image, the obtained two intermediate frequency coefficient matrixes are a horizontal intermediate frequency coefficient matrix (LH1) and a vertical intermediate frequency coefficient matrix (HL1).

The above method for embedding the image digital watermark can further have following characteristics:

before the step of adjusting the magnitude of the first frequency coefficient and the second frequency coefficient according to the watermark values to be embedded at said embedment locations, the method also comprising: scrambling and/or encrypting the watermark.

In order to solve the above technical problem, the present invention further proposes a system for embedding an image digital watermark, which comprises a matrix transform processing module, a storage module and a watermark embedment processing module, wherein:

the matrix transform processing module is configured to: perform a discrete wavelet transform (DWT) on an original carrier digital image to obtain two intermediate frequency coefficient matrixes; firstly perform a discrete cosine transform (DCT) on one of the two intermediate frequency coefficient matrixes, then perform the DWT, and then select an obtained low frequency coefficient matrix as a first low frequency coefficients matrix; perform the DWT on another intermediate frequency coefficient matrix, and then select an obtained low frequency coefficient matrix as a second low frequency coefficient matrix;

the storage module is configured to: store a corresponding relationship between a preset embedded value and a magnitude relationship between a first low frequency coefficient and a second low frequency coefficient obtained after being transformed by the matrix transform processing module;

the watermark embedment processing module is configured to: adjust magnitude of the first frequency coefficient and the second frequency coefficient at various same embedment locations in the first low frequency coefficient matrix and the second low frequency coefficient matrix according to watermark values to be embedded at said embedment locations to make a magnitude relationship between two adjusted low frequency coefficients comply with the corresponding relationship between the preset embedded value and the magnitude relationship between the two low frequency coefficients in the storage module.

The above system for embedding the image digital watermark can further have following characteristics:

the watermark embedment processing module is also configured to: scramble and/or encrypt the watermark before adjusting the magnitude of the first low frequency coefficient and second low frequency coefficient according to the watermark values to be embedded at said embedment locations.

In order to solve the above technical problem, the present invention further proposes a method for extracting an image digital watermark, which comprises:

performing a discrete wavelet transform (DWT) on a watermark embedded image to obtain two intermediate frequency coefficient matrixes;

firstly performing a discrete cosine transform (DCT) on one of the two intermediate frequency coefficient matrixes, then performing the DWT, and then selecting an obtained low frequency coefficient matrix as a first low frequency coefficient matrix;

performing the DWT on another intermediate frequency coefficient matrix and selecting an obtained low frequency coefficient matrix as a second low frequency coefficient matrix; and comparing a magnitude relationship between a first low frequency coefficient and a second low frequency coefficient at various same locations in the first low frequency coefficient matrix and second low frequency coefficient matrix, and matching an obtained magnitude relationship between the first low frequency coefficient and the second low frequency coefficient with a corresponding relationship between a preset embedded value and a magnitude relationship between the two low frequency coefficients to obtain embedded value at each embedment location, as so to obtain an embedded digital watermark image.

The above method for extracting the image digital watermark can further have following characteristics:

after performing the DWT on the watermark embedded image, the obtained two intermediate frequency coefficient matrixes are a horizontal intermediate frequency coefficient matrix ($LH1\_Y$) and a vertical intermediate frequency coefficient matrix ($HL1\_Y$).

The above method for extracting the image digital watermark can further have following characteristics:

if the watermark is scrambled and/or encrypted when embedding the watermark, re-sorting and/or decrypting the embedded digital watermark image after obtaining the embedded digital watermark image.

In order to solve the above technical problem, the present invention further proposes a system for extracting an image digital watermark, which comprises a matrix transform processing module, a storage module and a watermark extraction processing module, wherein:

the matrix transform processing module is configured to: performing a discrete wavelet transform (DWT) on a watermark embedded image to obtain two intermediate frequency coefficient matrixes; firstly perform a discrete cosine transform (DCT) on one of the two intermediate frequency coefficient matrixes, then perform the DWT, and then select an obtained low frequency coefficient matrix as a first low frequency coefficient matrix; perform the DWT on another intermediate frequency coefficient matrix and then select an obtained low frequency coefficient matrix as a second low frequency coefficient matrix;

the storage module is configured to: store a corresponding relationship between a preset embedded value and a magnitude relationship between a first low frequency coefficient and a second low frequency coefficient obtained after being transformed by the matrix transform processing module;

the watermark extraction processing module is configured to: compare a magnitude relationship between the first low frequency coefficient and the second low frequency coefficient at various same locations in the first low frequency coefficient matrix and second low frequency coefficient matrix, and match an obtained magnitude relationship between the first low frequency coefficient and the second low frequency coefficient with the corresponding relationship between the preset embedded value and the magnitude relationship between the two low frequency coefficients in the storage module to obtain an embedded value at each embedment location, as so to obtain an embedded digital watermark image.

The above system for extracting the image digital watermark can further have following characteristics:

the watermark extraction processing module is also configured to: re-sort and/or decrypt the watermark after obtaining the embedded digital watermark image.

The method and system for embedding and extracting an image digital watermark proposed in the present invention have a good watermark invisibility, and can resist various attacks such as histogram equalization, image brightness adjustment, contrast adjustment, salt and pepper noise, multiplicative noise, Gaussian noise, low pass filtering, and Joint Photographic Experts Group (JPEG) compression. In the method and the system, the watermarks have strong robustness and the digital watermarks can be extracted in the case without the original carrier image. Thus the method and system can be widely used in the fields of copyright protection and information secrecy.

PREFERRED EMBODIMENTS OF THE PRESENT INVENTION

In the example of the present invention, it is assumed that the original carrier digital image is X and the digital watermark image is W. In the following, the embodiment of the present invention will be illustrated in detail with reference to drawings.

Figure 1:
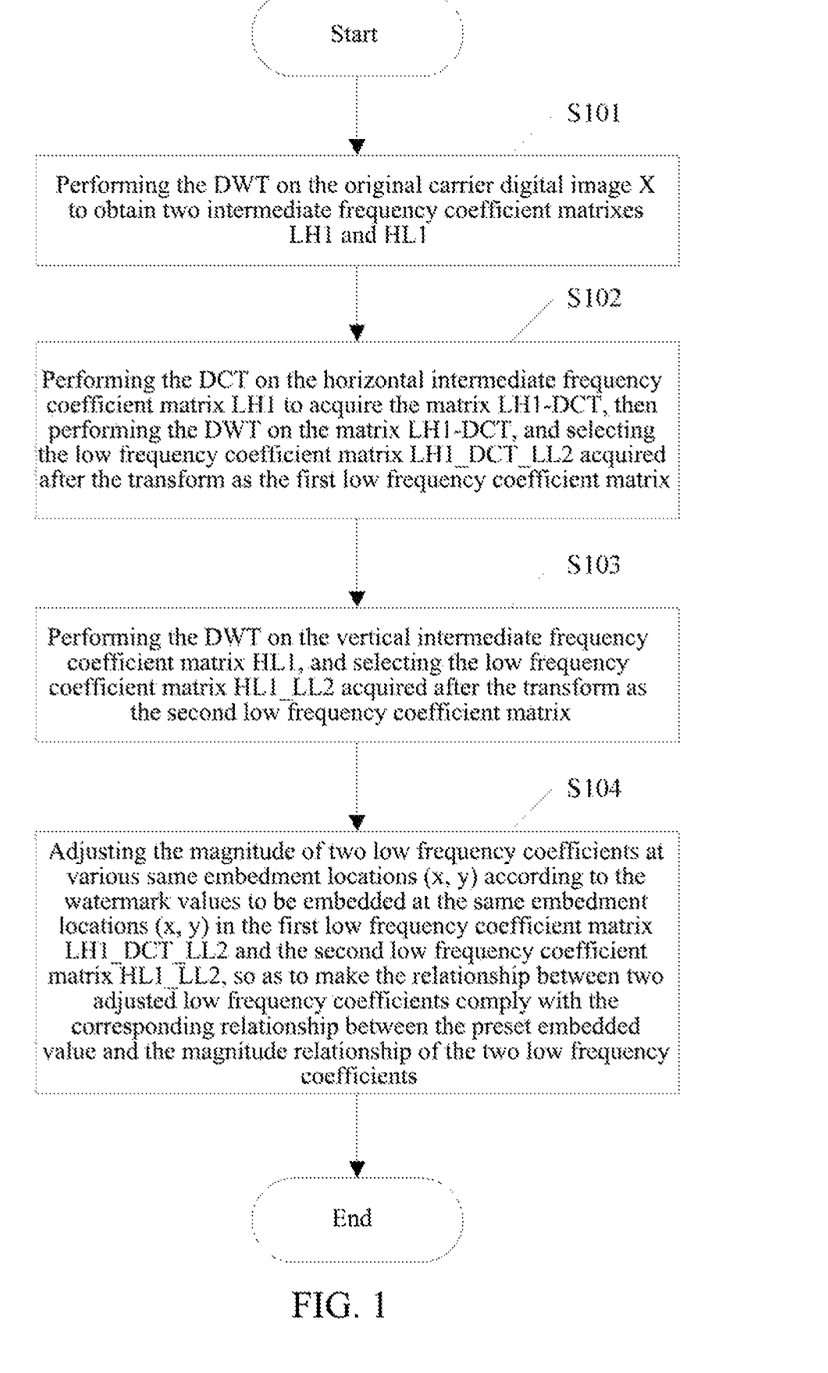
FIG. 1 is a flow chart of the method for embedding an image digital watermark in accordance with an example of the present invention.

With reference to FIG. 1, FIG. 1 shows a method for embedding an image digital watermark in accordance with an example of the present invention, and the method comprises the following steps:

S101: DWT is performed on the original carrier digital image X to obtain two intermediate frequency coefficient matrixes LH1 and HL1;

it can be obtained after performing DWT on the original carrier digital image X that: the low frequency coefficient matrix LL1, the horizontal intermediate frequency coefficient matrix LH1, the vertical frequency coefficient matrix HL1, and the high frequency coefficient matrix HH1. Two intermediate frequency coefficient matrixes LH1 and HL1 are selected for the following operations.

S102: DCT is performed on the horizontal intermediate frequency coefficient matrix LH1 to acquire the matrix LH1_DCT, then DWT is performed on the matrix LH1_DCT, and the low frequency coefficient matrix LH1_DCT_LL2 obtained after the transform is selected as the first low frequency coefficient matrix;

the low frequency coefficient matrix LH1_DCT_LL2, the intermediate frequency coefficient matrixes LH1_DCT_LH2 and LH1_DCT_HL2, and the high frequency coefficient matrix LH1_DCT_HH2 will be acquired after performing DWT on the matrix LH1_DCT, and the low frequency coefficient matrix LH1_DCT_LL2 thereinto is selected as the first low frequency coefficient matrix;

S103: DWT is performed on the vertical intermediate frequency coefficient matrix HL1, and the low frequency coefficient matrix HL1_LL2 obtained after the transform is selected as the second low frequency coefficient matrix;

the low frequency coefficient matrix HL1_LL2, the intermediate frequency coefficient matrixes HL1_LH2 and HL1_HL2, and the high frequency coefficient matrix HL1_HH2 will be acquired after performing DWT on the matrix HL1, and the low frequency coefficient matrix HL1_LL2 thereinto is selected as the second low frequency coefficients matrix;

S104: the magnitude of two low frequency coefficients are adjusted at various same embedment locations (x, y) according to the watermark values to be embedded at the same embedment locations (x, y) in the first low frequency coefficient matrix LH1_DCT_LL2 and the second low frequency coefficient matrix HL1_LL2, so as to make the relationship between the two adjusted low frequency coefficients comply with the corresponding relationship between the preset embedded value and the magnitude relationship between the two low frequency coefficients.

The watermark to be embedded is a significant binary image, that is, the embedded values at various embedment locations (x, y) are 0 or 1.

The corresponding relationship between the preset embedded value and the magnitude relationship between the two low frequency coefficients could be: if 0 will be embedded at an embedment location (i, j), then the first low frequency coefficient LH1_DCT_LL2(i, j)< the second low frequency coefficient HL1_LL2(i, j) corresponding to this location (i, j); if 1 will be embedded at the embedment location (i, j), then the first low frequency coefficient LH1_DCT_LL2(i, j)> the second low frequency coefficient HL1_LL2(i, j) corresponding to this location (i, j); where 1<i<M, 1<j<N, M is ¼ of the height of the original carrier digital image X, and N is ¼ of the width of the original carrier digital image X.

Certainly, the corresponding relationship can be set as others, and the present invention does not limit the above relationship, as long as it is made that different embedded values correspond different magnitude relationships between the first low frequency coefficient LH1_DCT_LL2(i, j) and the second low frequency coefficient HL1_LL2(i, j), so that the corresponding magnitude relationship between the first low frequency coefficient LH1_DCT_LL2(i, j) and the second low frequency coefficient HL1_LL2(i, j) can be explicitly obtained according to the corresponding relationship when the embedded value is already obtained, and vice versa, the corresponding embedded value can be explicitly obtained according to the corresponding relationship when the magnitude relationship between the first low frequency coefficient LH_DCT_LL2(i, j) and the second low frequency coefficient HL1_LL2(i, j) is already obtained.

The magnitude relationship between LH1_DCT_LL2(x, y) and HL1_LL2(x, y) can be adjusted according to certain rules if it is needed, for example, the adjustment can be achieved by exchanging the values of the two coefficients, or fine adjustment is performed on the relationship when the two data are equal.

Steps S101 to S104 completes the embedment of the watermark, a better balance point between the invisibility and robustness of the watermark can be acquired by performing the fine adjustment on the two low frequency coefficients obtained after the transform.

In the abovementioned method, the embedded image is in the form of the plain text, when it wants to embed a hidden image, the hidden image can not be kept secrecy if it is intercepted by the third party. In view of this situation, the digital watermark image W in this example of the present invention can be scrambled and/or encrypted and then is embedded, and thus the information leakage can be effectively prevented.

In another example, it also might be that the abovementioned S102 could be performing DCT on the vertical intermediate frequency coefficient matrix HL1 to obtain the matrix HL1_DCT, then performing DWT on the matrix HL1_DCT, and selecting the low frequency coefficient matrix HL1_DCT_LL2 obtained after the transform as the first low frequency coefficient matrix. Accordingly the abovementioned S103 could be performing DWT on the horizontal intermediate frequency coefficient matrix LH1 and selecting the low frequency coefficient matrix LH1_LL2 obtained after the transform as the second low frequency coefficient matrix. Other steps are unchanged.

Figure 2:
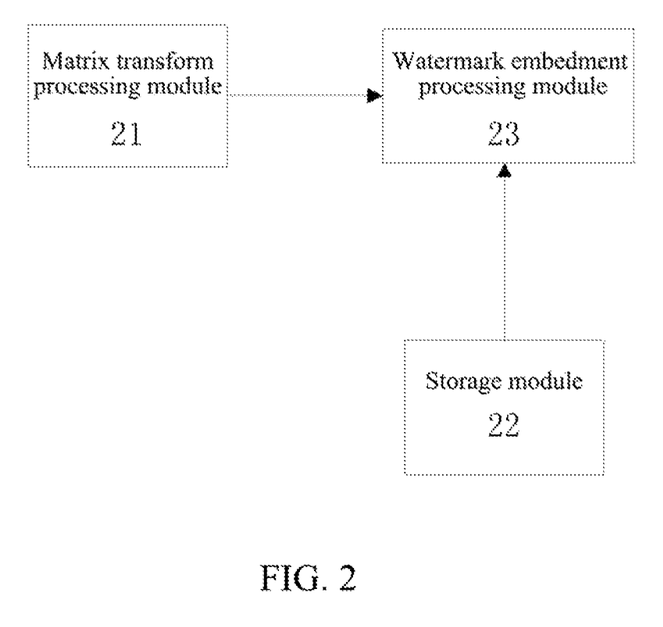
FIG. 2 is a block diagram of the system for embedding an image digital watermark in accordance with an example of the present invention.

In order to achieve the above method for embedding a watermark, the example of the present invention also provides a system for embedding a watermark, as shown in FIG. 2, and the system comprises a matrix transform processing module 21, a storage module 22 and a watermark embedment processing module 23, wherein:

the matrix transform processing module 21 is used to: perform DWT on the original carrier digital image to obtain two intermediate frequency coefficient matrixes; first perform DCT on one intermediate frequency coefficient matrix thereinto and then perform DWT, and then select the obtained low frequency coefficient matrix as the first low frequency coefficient matrix; perform DWT on another intermediate frequency coefficient matrix and then select the obtained low frequency coefficient matrix as the second low frequency coefficient matrix;

the storage module 22 is used to: store the corresponding relationship between a preset embedded value and a magnitude relationship between the first low frequency coefficient and the second low frequency coefficient obtained after being transformed by the matrix transform processing module 21;

the watermark embedment processing module is used to: adjust the magnitude of the first low frequency coefficient and second frequency coefficient at various same embedment locations according to the watermark values to be embedded at the same embedment locations (x, y) in the first low frequency coefficient matrix and second low frequency coefficient matrix, so as to make the relationship between the two adjusted low frequency coefficients comply with the corresponding relationship between the preset embedded value and the magnitude relationship between the two low frequency coefficients in the storage module 22.

Furthermore, the watermark embedment processing module 23 is also used to: scramble and/or encrypt the watermark before adjusting the magnitude of the first low frequency coefficient and second low frequency coefficient in accordance with the value to be embedded at the embedment locations.

Figure 3:
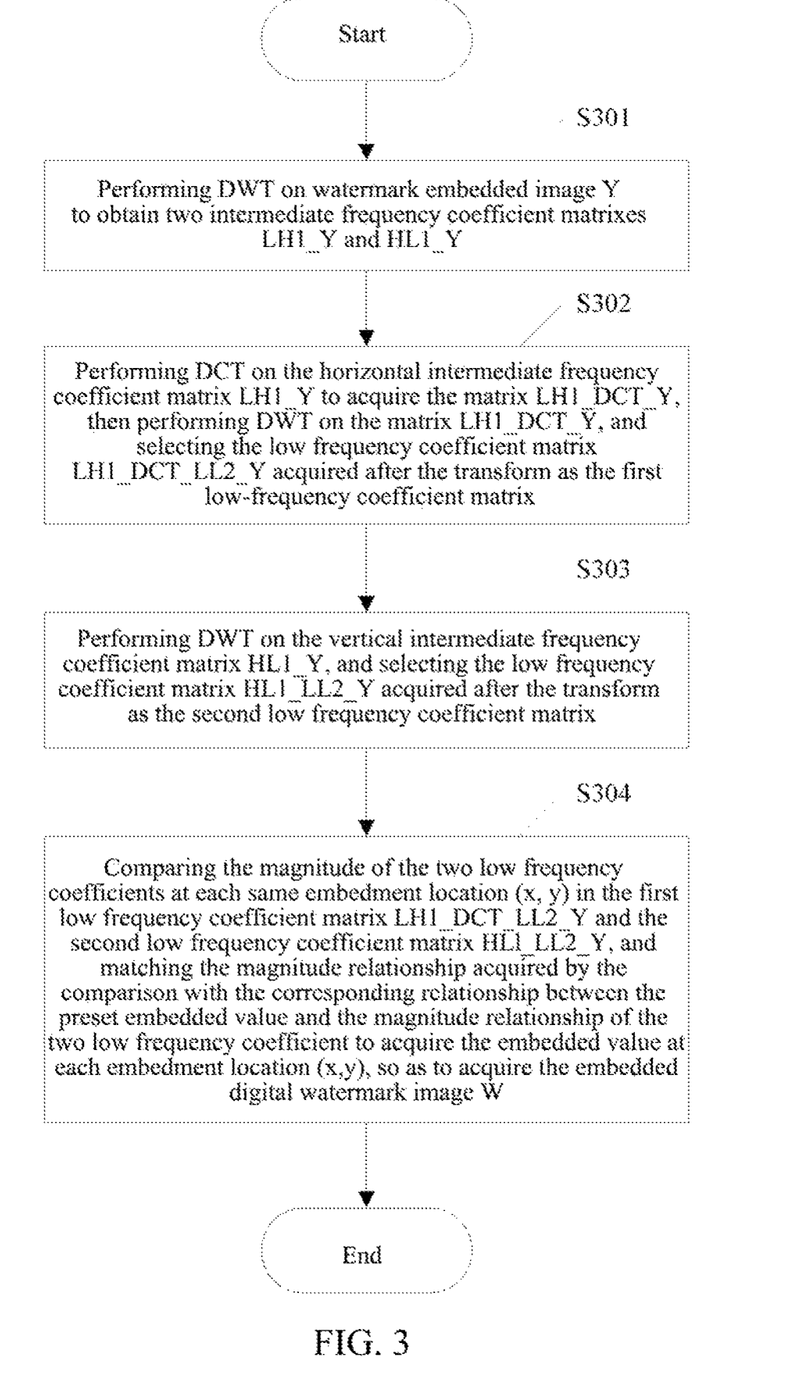
FIG. 3 is a flow chart of the method for embedding an image digital watermark in accordance with an example of the present invention.

With reference to FIG. 3 in the following, FIG. 3 shows the method for extracting an image digital watermark in accordance with the embodiment of the present invention, which is used to extract the watermark embedded with the method shown in FIG. 1, and the method comprises the following steps:

S301: DWT is performed on a watermark embedded image Y to obtain two intermediate frequency coefficient matrixes LH1_Y and HL1_Y;

it can be obtained after performing DWT on the watermark-embedded image Y that: the low frequency coefficient matrix LL1_Y, the horizontal intermediate frequency coefficient matrix LH1_Y, the vertical intermediate frequency coefficient matrix HL1_Y and the high frequency coefficient matrix HH1_Y. Two intermediate frequency coefficient matrixes LH1_Y and HL1_Y are selected for the following operations.

S302: DCT is performed on the horizontal intermediate frequency coefficient matrix LH1_Y to acquire the matrix LH1_DCT_Y, then DWT is performed on the matrix LH1_DCT_Y, and the low frequency coefficient matrix LH1_DCT_LL2_Y acquired after the transform is selected as the first low frequency coefficient matrix;

the low frequency coefficient matrix LH1_DCT_LL2_Y, the intermediate frequency coefficient matrixes LH1_DCT_LH2_Y and LH1_DCT_HL2_Y, and the high frequency coefficient matrix LH1_DCT_HH2_Y will be acquired after performing DWT on the matrix LH1_DCT_Y, and the low frequency coefficient matrix LH1_DCT_LL2_Y thereinto is selected as the first low frequency coefficient matrix;

S303: DWT is performed on the vertical intermediate frequency coefficient matrix HL1_Y, and the low frequency coefficient matrix HL1_LL2_Y acquired after the transform is selected as the second low frequency coefficient matrix;

the low frequency coefficient matrix HL1_LL2_Y, the intermediate frequency coefficient matrixes HL1_LH2_Y and HL1_HL2_Y, and the high frequency coefficient matrix HL1_HH2_Y will be acquired after performing DWT on the matrix HL1_Y, and the low frequency coefficient matrix HL1_LL2_Y thereinto is selected as the second low frequency coefficient matrix.

The processing method of the abovementioned steps S301~S303 is the same with that of the steps S101~S103, whereas the processing objects are different. The processing object is the original carrier digital image X in the process for embedding the watermark shown in FIG. 1, and the processing object is the watermark embedded image Y in the process for extracting the watermark shown in FIG. 3.

If the abovementioned another method is used in the process for embedding the watermark, namely step S102 is performing DCT on the vertical intermediate frequency coefficient matrix HL1 to obtain the matrix HL1_DCT, then performing DWT on the matrix HL1_DCT, and selecting the low frequency coefficient matrix HL1_DCT_LL2 obtained after the transform as the first low frequency coefficient matrix, step S103 is performing DWT on the horizontal intermediate frequency coefficient matrix LH1 and selecting the low frequency coefficient matrix LH1_LL2 obtained after the transform as the second low frequency coefficient matrix, and other steps are unchanged, accordingly, the same method is used in the process for extracting the watermark.

S304: the magnitude of the two low frequency coefficients at various same embedment locations (x, y) in the first low frequency coefficient matrix LH1_DCT_LL2_Y and the second low frequency coefficient matrix HL1_LL2_Y is compared, and the magnitude relationship acquired by the comparison is matched with the corresponding relationship between the preset embedded value and the magnitude relationship between the two low frequency coefficients to acquire the embedded value at each embedment location (x, y), so as to acquire the embedded digital watermark image W.

The above steps S301~S304 are equivalent to the inverse transforms of steps S101~S104, and the embedded digital watermark image W can be easily extracted based on the corresponding relationship between the same preset embedded value and the magnitude relationship between the two low frequency coefficients acquired after the processing.

If the watermark is scrambled and/or encrypted during embedding the watermark, it should also re-sort and/or decrypt the digital watermark image after acquiring the embedded digital watermark image.

Figure 4:
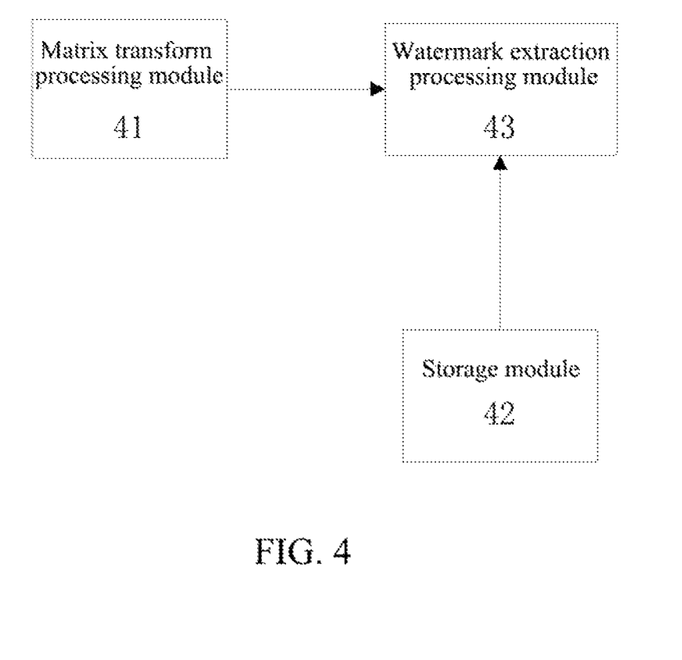
FIG. 4 is a block diagram of the system for embedding an image digital watermark in accordance with an example of the present invention.

In order to achieve the abovementioned method for embedding the watermark, the example of the present invention also provides a system, as shown in FIG. 4, and a system comprises the matrix transform processing module 41, a storage module 42 and a watermark extraction processing module 43, wherein:

the matrix transform processing module 41 is used to: perform DWT on the watermark embedded image to obtain two intermediate frequency coefficient matrixes; first perform DCT on one intermediate frequency coefficient matrix thereinto and then perform DWT, and then select the obtained low frequency coefficient matrix as the first low frequency coefficient matrix; perform DWT on another intermediate frequency coefficient matrix and then select the obtained low frequency coefficient matrix as the second low frequency coefficient matrix;

the storage module 42 is used to: store the corresponding relationship between a preset embedded value and a magnitude relationship between the first low frequency coefficient and the second low frequency coefficient obtained after being transformed by the matrix transform processing module 41;

the watermark extraction processing module 43 is used to: compare the magnitude of the first low frequency coefficient and second low frequency coefficient at various same embedment locations in the first low frequency coefficient matrix and second low frequency coefficient matrix, and match the acquired magnitude relationship between the two coefficients with the corresponding relationship between the preset embedded value and the magnitude relationship between the two low frequency coefficients to acquire the embedded value at each embedment location, so as to acquire the embedded digital watermark image.

Furthermore, the watermark extraction processing module 43 is also used to: re-sort and/or decrypt the watermark after acquiring the embedded digital watermark image.

Certainly, the present invention can also have a variety of other examples, and those skilled in the art can make various corresponding modifications and transformations to the present invention without departing from the spirit and essence of the present invention, and such corresponding modification and transformations should fall into the protection scope of the claims of the present invention.

It can be understood by the ordinary person skilled in the art that all or parts of steps in the abovementioned method can be fulfilled by instructing the relevant hardware with a program, and said program can be stored in a computer readable storage medium such as the read only storage, the magnetic disk or the optical disk and so on. Optionally, parts or all of steps in the abovementioned examples can be implemented with one or more integrated circuits. Correspondingly, each module/unit in the abovementioned embodiment can be implemented in the form of hardware or in the form of software function modules. The present invention is not limited to any specific form of combinations of the hardware and software.

INDUSTRIAL APPLICABILITY

The method and system for embedding and extracting an image digital watermark proposed in the present invention have a good watermark invisibility, and can resist various attacks such as histogram equalization, image brightness adjustment, contrast adjustment, salt and pepper noise, multiplicative noise, Gaussian noise, low pass filtering, and Joint Photographic Experts Group (JPEG) compression. In the method and the system, the watermarks have strong robustness and the digital watermarks can be extracted in the case without the original carrier image. Thus the method and system can be widely used in the fields of copyright protection and information secrecy.

What is claimed is:

1. A method for embedding an image digital watermark, which comprises:

performing a discrete wavelet transform (DWT) on an original carrier digital image to obtain two intermediate frequency coefficient matrixes;

firstly performing a discrete cosine transform (DCT) on one of the two intermediate frequency coefficient matrixes, then performing the DWT, and then selecting an obtained low frequency coefficient matrix as a first low frequency coefficient matrix;

performing the DWT on another intermediate frequency coefficient matrix, and then selecting an obtained low frequency coefficient matrix as a second low frequency coefficient matrix; and     adjusting magnitude of a first frequency coefficient and a second frequency coefficient at various same embedment locations in the first low frequency coefficient matrix and the second low frequency coefficient matrix according to watermark values to be embedded at said embedment locations to make a magnitude relationship between two adjusted low frequency coefficients comply with a corresponding relationship between a preset embedded value and a magnitude relationship between the two low frequency coefficients.

2. The method of claim 1, wherein, after performing the DWT on the original carrier digital image, the obtained two intermediate frequency coefficient matrixes are a horizontal intermediate frequency coefficient matrix (LH1) and a vertical intermediate frequency coefficient matrix (HL1).

3. The method of claim 1, before the step of adjusting the magnitude of the first frequency coefficient and the second frequency coefficient according to the watermark values to be embedded at said embedment locations, the method also comprising:

scrambling and/or encrypting the watermark.

4. A system for embedding an image digital watermark, which comprises a matrix transform processing module, a storage module and a watermark embedment processing module, wherein:

the matrix transform processing module is configured to: perform a discrete wavelet transform (DWT) on an original carrier digital image to obtain two intermediate frequency coefficient matrixes; firstly perform a discrete cosine transform (DCT) on one of the two intermediate frequency coefficient matrixes, then perform the DWT, and then select an obtained low frequency coefficient matrix as a first low frequency coefficients matrix; perform the DWT on another intermediate frequency coefficient matrix, and then select an obtained low frequency coefficient matrix as a second low frequency coefficient matrix;

the storage module is configured to: store a corresponding relationship between a preset embedded value and a magnitude relationship between a first low frequency coefficient and a second low frequency coefficient obtained after being transformed by the matrix transform processing module;

the watermark embedment processing module is configured to: adjust magnitude of the first frequency coefficient and the second frequency coefficient at various same embedment locations in the first low frequency coefficient matrix and the second low frequency coefficient matrix according to watermark values to be embedded at said embedment locations to make a magnitude relationship between two adjusted low frequency coefficients comply with the corresponding relationship between the preset embedded value and the magnitude relationship between the two low frequency coefficients in the storage module.

5. The system of claim 4, wherein:
the watermark embedment processing module is also configured to: scramble and/or encrypt the watermark before adjusting the magnitude of the first low frequency coefficient and second low frequency coefficient according to the watermark values to be embedded at said embedment locations.

6. The method of claim 1, which further comprises:
performing the DWT on a watermark embedded image to obtain two intermediate frequency coefficient matrixes;
firstly performing the DCT on one of the two intermediate frequency coefficient matrixes, then performing the DWT, and then selecting an obtained low frequency coefficient matrix as a first low frequency coefficient matrix;
performing the DWT on another intermediate frequency coefficient matrix and selecting an obtained low frequency coefficient matrix as a second low frequency coefficient matrix; and
comparing a magnitude relationship between a first low frequency coefficient and a second low frequency coefficient at various same locations in the first low frequency coefficient matrix and second low frequency coefficient matrix, and matching an obtained magnitude relationship between the first low frequency coefficient and the second low frequency coefficient with a corresponding relationship between a preset embedded value and a magnitude relationship between the two low frequency coefficients to obtain embedded value at each embedment location, as so to obtain an embedded digital watermark image.

7. The method of claim 6, wherein:
after performing the DWT on the watermark embedded image, the obtained two intermediate frequency coefficient matrixes are a horizontal intermediate frequency coefficient matrix (LH1_Y) and a vertical intermediate frequency coefficient matrix (HL1_Y).

8. The method of claim 7, which also comprises:
if the watermark is scrambled and/or encrypted when embedding the watermark, re-sorting and/or decrypting the embedded digital watermark image after obtaining the embedded digital watermark image.

9. A system for extracting an image digital watermark, which comprises a matrix transform processing module, a storage module and a watermark extraction processing module, wherein:
the matrix transform processing module is configured to: performing a discrete wavelet transform (DWT) on a watermark embedded image to obtain two intermediate frequency coefficient matrixes; firstly perform a discrete cosine transform (DCT) on one of the two intermediate frequency coefficient matrixes, then perform the DWT, and then select an obtained low frequency coefficient matrix as a first low frequency coefficient matrix; perform the DWT on another intermediate frequency coefficient matrix and then select an obtained low frequency coefficient matrix as a second low frequency coefficient matrix;
the storage module is configured to: store a corresponding relationship between a preset embedded value and a magnitude relationship between a first low frequency coefficient and a second low frequency coefficient obtained after being transformed by the matrix transform processing module;
the watermark extraction processing module is configured to: compare a magnitude relationship between the first low frequency coefficient and the second low frequency coefficient at various same locations in the first low frequency coefficient matrix and second low frequency coefficient matrix, and match an obtained magnitude relationship between the first low frequency coefficient and the second low frequency coefficient with the corresponding relationship between the preset embedded value and the magnitude relationship between the two low frequency coefficients in the storage module to obtain an embedded value at each embedment location, as so to obtain an embedded digital watermark image.

10. The system of claim 9, wherein,
the watermark extraction processing module is also configured to: re-sort and/or decrypt the watermark after obtaining the embedded digital watermark image.

* * * * *